No. 798,450. PATENTED AUG. 29, 1905.
E. ROBERTS.
LOAD PULLER FOR INCLINED BRIDGES, &c.
APPLICATION FILED APR. 19, 1905.
2 SHEETS—SHEET 2.
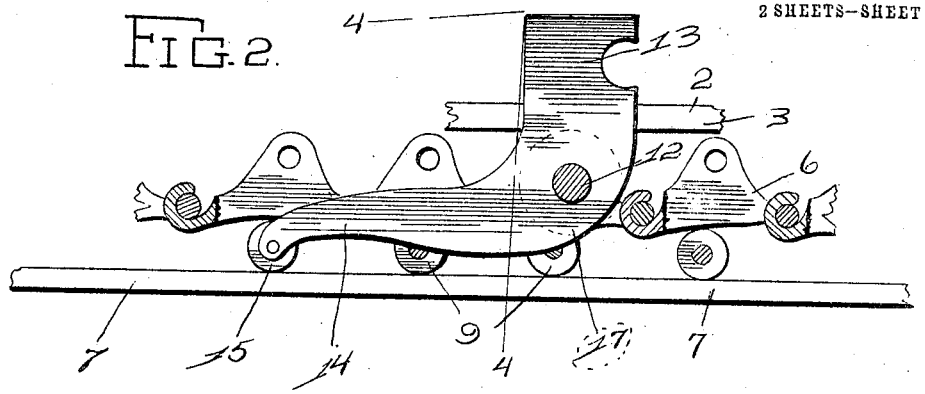
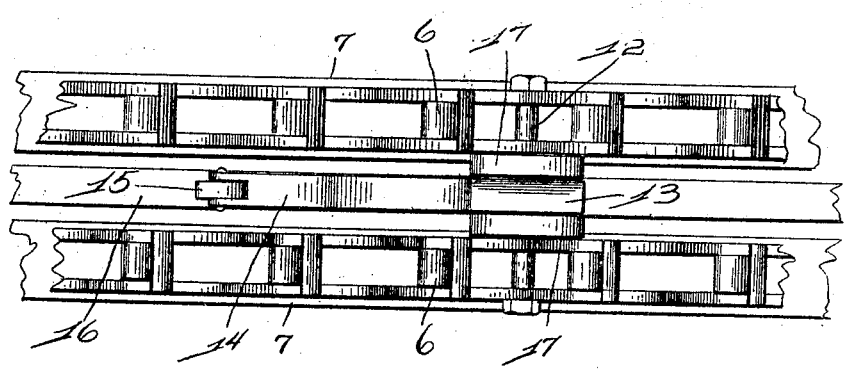
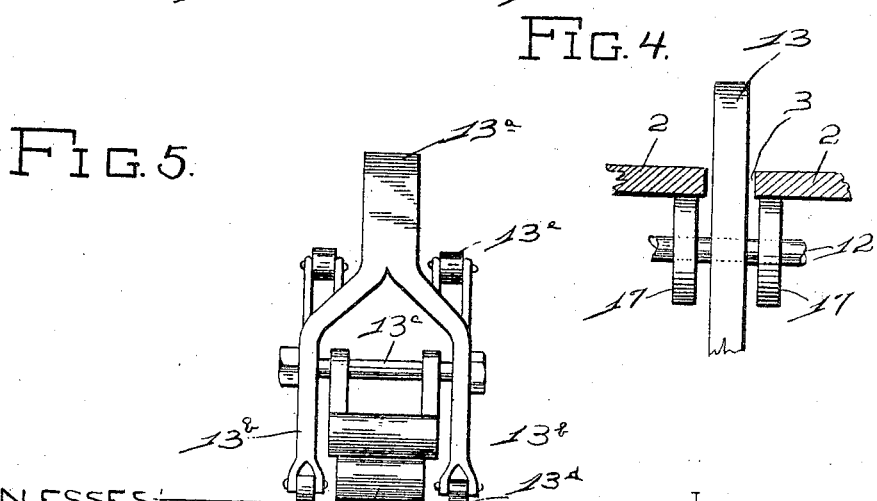
WITNESSES
Edw. M. Harrington
M. P. Smith
INVENTOR
Edgar Roberts.
By Higdon & Longan ATTYS

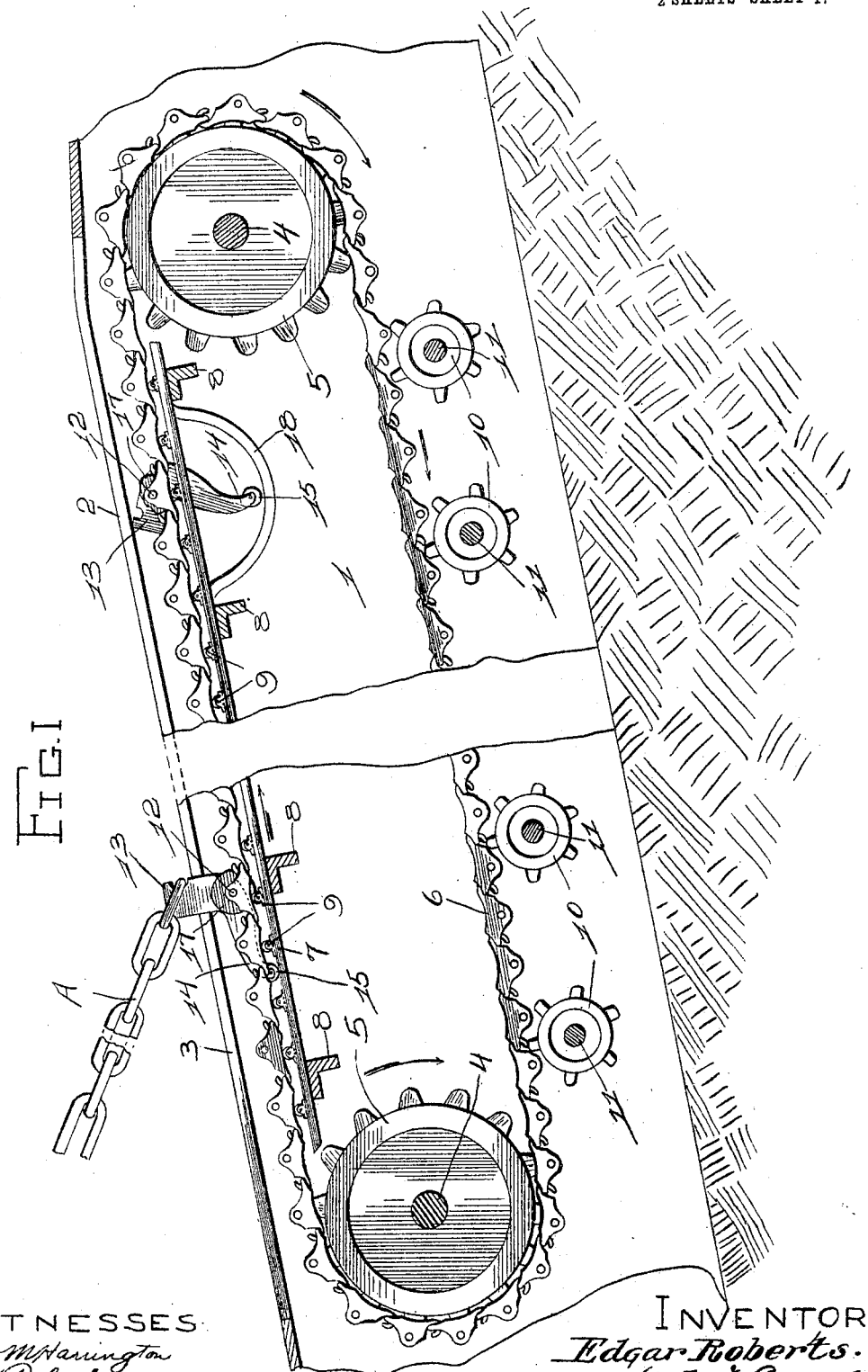

UNITED STATES PATENT OFFICE.

EDGAR ROBERTS, OF EAST ST. LOUIS, ILLINOIS.

LOAD-PULLER FOR INCLINED BRIDGES, &c.

No. 798,450.　　　Specification of Letters Patent.　　　Patented Aug. 29, 1905.

Application filed April 19, 1905. Serial No. 256,449.

*To all whom it may concern:*

Be it known that I, EDGAR ROBERTS, a citizen of the United States, and a resident of the city of East St. Louis, Illinois, have invented certain new and useful Improvements in Load-Pullers for Inclined Bridges, Viaducts, and other Roadways, of which the following is a specification containing a full, clear, and exact description, reference being had to the accompanying drawings, forming a part hereof.

My invention relates to a load-puller for inclined bridges, viaducts, and other roadways, and has for its object the provision of a simple and easily-operated mechanism arranged beneath the surface of the ground on inclined roadways for pulling loaded trucks or wagons up to the top of the incline.

My improved apparatus is particularly intended for use at adjacent levees or docks where boats are unloaded and also around freight-depots and the like, or it may be arranged upon any street where there is a sharp incline and over which there is considerable hauling of heavy loads.

To the above purposes my invention consists in certain novel features of construction and arrangement of parts that will be hereinafter fully shown, described, and claimed.

In the drawings, Figure 1 is a longitudinal section taken through the conduit in which my improved apparatus is located. Fig. 2 is an enlarged side elevation of an automatic dog or hook made use of in carrying out my invention. Fig. 3 is a plan view of the dog or hook seen in Fig. 2 and the chains to which said hook is secured. Fig. 4 is an enlarged detail section taken approximately on the line 4 4 of Fig. 2. Fig. 5 is an end elevation of the type of dog or engaging hook that is used in connection with a single endless chain.

Referring by numerals to the accompanying drawings, 1 indicates the conduit, which is of any suitable size and shape, constructed just below the surface of the earth and provided with the cover 2, in which is formed the elongated slot 3, that necessarily extends from the rear end of the conduit to the upper end thereof.

Arranged for rotation in suitable bearings at each end of the conduit are transversely-arranged shafts 4, one or both of which may be driven in any suitable manner. Fixed on each shaft is a pair of sprocket-wheels 5, and traveling around each corresponding pair of sprocket-wheels are the suitable links or sprocket-chains 6. Suitably located immediately beneath the portions of the sprocket-chains which are immediately beneath the slot 3 are tracks 7, that are supported by transverse angle-bars 8. The tracks 7 are preferably provided with antifriction-rollers 9, on which the chains ride. A series of sprocket-wheels 10 are journaled on transversely-arranged shafts 11 in the lower portion of the conduit, over which the sprocket-chains travel in passing from the upper pair of sprocket-wheels 5 to the lower pair. These sprocket-wheels 10 sustain the weight of the chain and prevent any sag thereof.

Pivotally held by means of pins 12 between certain links of the pair of sprocket-chains 6 are hooks 13, that are of such a length as that they will extend upwardly through the slot 3 in the top of the conduit when traveling from the lower end thereof to the upper end, and said hooks are provided with integral rearwardly-extending arms 14, to the rear ends of which are journaled the bearing-rollers 15. Located between the tracks 7 and supported by the cross-bars 8 and immediately beneath the path of travel of the hooks 13 is a single track 16, upon which the rollers 15 travel when the hooks are moving upwardly through the conduit.

Rotatably positioned upon the pins 12, on each side of each hook 13, are the rollers 17, that are adapted to bear against the under side of the top 2 of the conduit when the hooks are traveling from the lower to the upper end of said conduit. At a point adjacent the upper end of the conduit just in front of the upper pair of sprocket-wheels 5 the track 16 is bent downwardly, as indicated by 18, in U shape, this being the point where the hooks 13 automatically disengage from the chains or cables that are connected to the trucks or wagons that are being pulled up the incline.

In the modifications seen in Fig. 5 the hooks $13^a$ are bifurcated at their lower ends, as indicated by $13^b$, and are pivotally mounted upon transverse pins $13^c$, that are carried by a single chain. When this construction of a hook is made use of, the bifurcated lower ends $13^b$ are provided with antifriction-rollers $13^d$ at their lower ends and with similar antifriction-rollers $13^e$ at their upper ends, these rollers taking the place of the rollers 15 and 17, previously described.

In the operation of my improved load-puller the shafts 4 are driven in any suitable manner, and as a result thereof the sprocket-chains 6 are driven by said sprocket-wheels and travel throughout the conduit in directions indicated by the arrows in Fig. 1. As the hooks 13 pass to the upper side of the lower pair of sprocket-wheels 5, the upper ends of said hooks will travel upwardly through the slot 3, and as the rollers 15 pass onto the track 16 said hooks will be held in an upright position and the rollers 17 will ride immediately against the under side of the top 2 of the conduit adjacent the slot therein. The chains or cables, such as A, Fig. 1, that are secured at one end to the loaded trucks or carriages are now engaged at their opposite ends to said hooks, and as the apparatus continues to operate the loaded trucks or carriages are pulled to the top of the incline, where they are to be unloaded or taken away in the usual manner. When the hooks reach the upper end of the conduit, they automatically disengage themselves from the chains or cables, for the reason that said hooks swing backwardly and downwardly through the slot 3 as the rollers 15 pass downwardly into the U-shape bend 18 in the track 16.

An apparatus of my improved construction can be made of any size and can be adapted for use either in a warehouse or upon any incline where it is necessary to pull heavy loads from the bottom to the top thereof, and said apparatus possesses superior advantages in point of simplicity, durability, and general efficiency.

I claim—

1. In an apparatus of the class described, a pair of endless chains arranged for operation in an inclined conduit; hooks pivotally held between certain links of the sprocket-chains; a track supported in the top portion of the conduit on which the lower ends of the hooks travel, and there being a U-shaped bend in said track adjacent the upper end of the conduit in which the bearing ends of the hooks drop in their travel with the chains; substantially as specified.

2. In an apparatus of the class described, a pair of endless chains arranged for operation in an inclined conduit; a pair of supporting-tracks arranged in the top portion of the conduit for supporting the chains in their travel upwardly through the conduit; hooks pivotally arranged between certain of the links of said sprocket-chains; a track in the top portion of the conduit on which said hooks travel, and there being a U-shaped bend in said track adjacent the upper end of conduit into which the lower ends of the hooks drop in their travel with the chains; substantially as specified.

3. In an apparatus of the class described, a pair of endless sprocket-chains arranged for operation in an inclined conduit; tracks for said chains arranged in the upper portion of the conduit for supporting the chains in their travel upwardly through said conduit; a series of sprocket-wheels arranged in the bottom of the conduit for supporting the chains in their travel downwardly through the conduit; a track supported between the chains in the upper portion of the conduit, and having a U-shaped bend near the upper end of the conduit; hooks pivotally arranged between certain links of the chains and rollers carried by the lower ends of said hooks, which rollers travel on the single track; substantially as specified.

In testimony whereof I have signed my name to this specification in presence of two subscribing witnesses.

EDGAR ROBERTS.

Witnesses:
MARTIN P. SMITH,
EDW. M. HARRINGTON.